Figure 4:
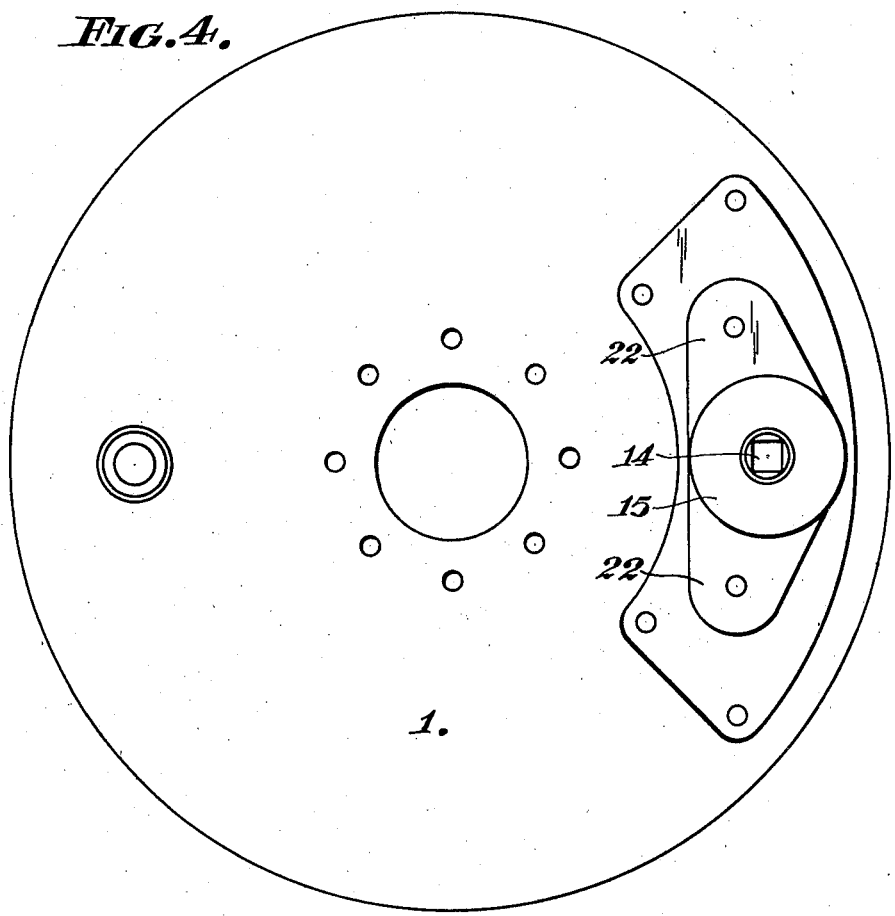

Dec. 6, 1949          S. JENKINS          2,490,135
ADJUSTING DEVICE FOR BRAKE SHOES OF EXPANDER BRAKES
Filed Aug. 22, 1944          3 Sheets-Sheet 1
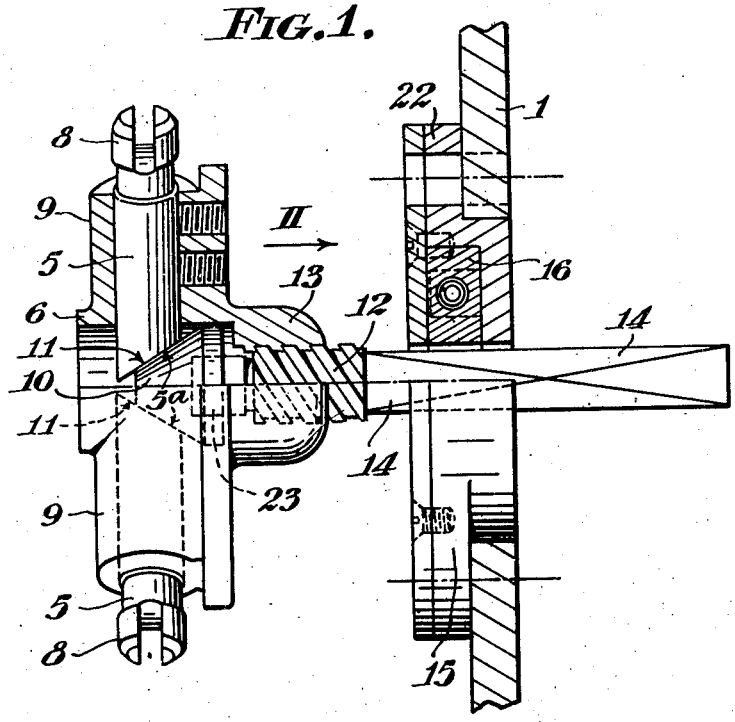
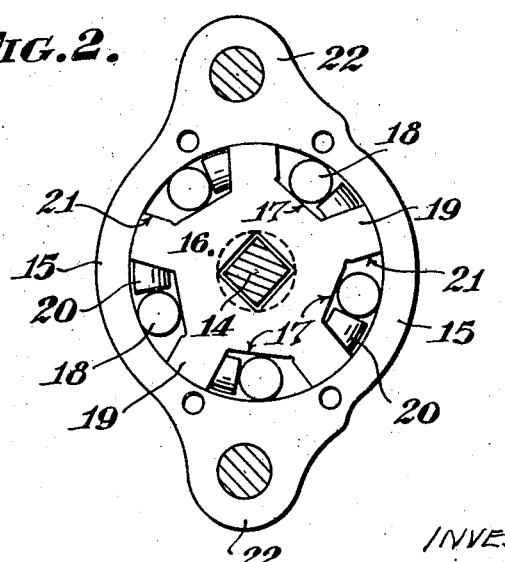
INVENTOR,
SPURGEON JENKINS

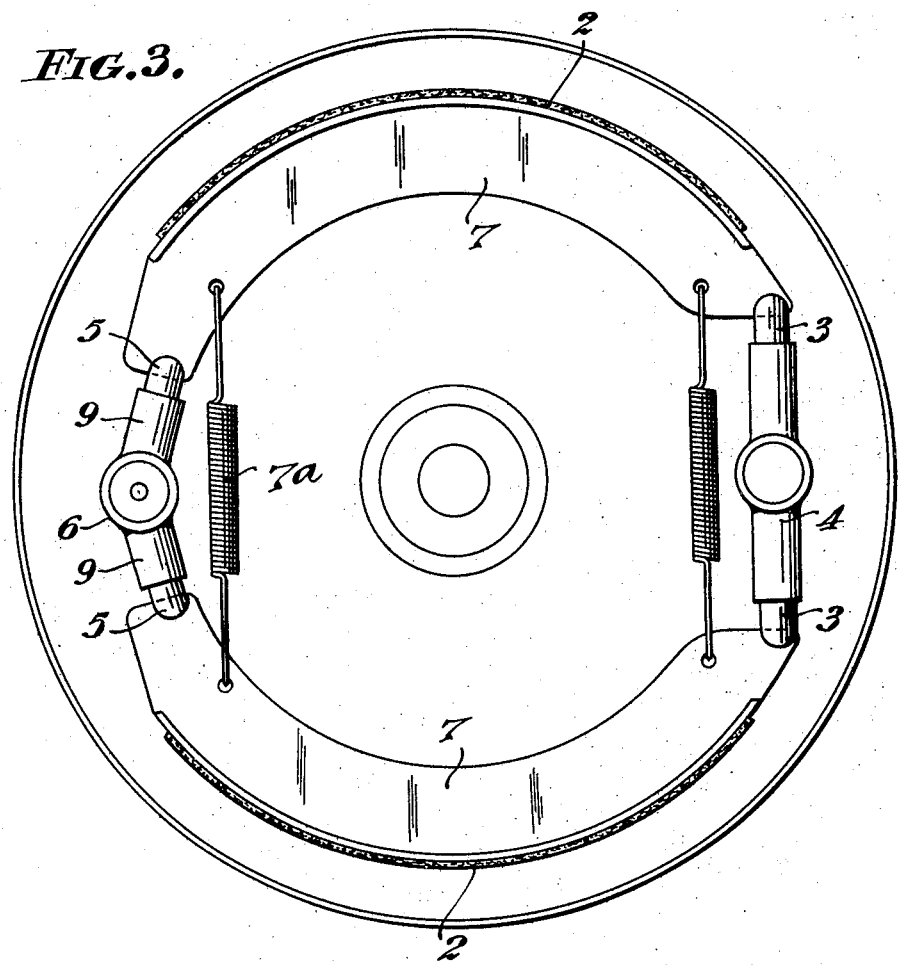
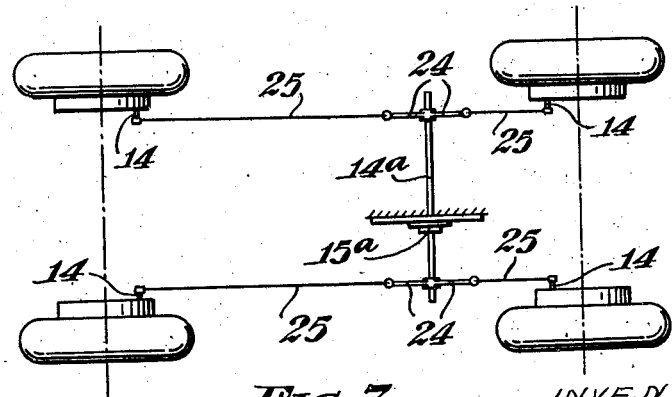

Dec. 6, 1949     S. JENKINS     2,490,135
ADJUSTING DEVICE FOR BRAKE SHOES OF EXPANDER BRAKES
Filed Aug. 22, 1944     3 Sheets-Sheet 3

INVENTOR
SPURGEON JENKINS

Patented Dec. 6, 1949

2,490,135

UNITED STATES PATENT OFFICE 2,490,135

ADJUSTING DEVICE FOR BRAKE SHOES OF EXPANDER BRAKES

Spurgeon Jenkins, Llandaff, England

Application August 22, 1944, Serial No. 550,663
In Great Britain January 22, 1943

Section 1, Public Law 690, August 8, 1946
Patent expires January 22, 1963

2 Claims. (Cl. 188—79.5)

This invention relates to adjusting devices for the brake shoes of expander brakes of the type frequently adopted on motor road vehicles and in which a pair of arcuate shoes are connected at one end to the expanding device mounted upon a back plate and engaged at their other ends with the shoe adjuster adapted to be manipulated to adjust the shoes in order to take up for wear, or to ensure correct spacing of the shoes relatively to the enclosing drum, the shoes having suitable resilient means connected to them to yieldingly oppose their movement away from each other towards the drum. The object of this invention is to provide an adjusting device which is unidirectional in its operation yet affords a check against excessive tightening or closeness of the shoes against the drum in such manner as to ensure that the most suitable "off clearance" of the shoes from the drum is obtained. As has been proposed heretofore an adjuster for the brake shoes of an expander brake according to this invention embodies a cone, cam or wedging member common to the brake shoes, and adjustable for varying the normal setting of the shoes, and the invention is characterised in that the means for actuating the cone, cam or wedging member comprises an unidirectional driver which normally prevents adjustment of the shoes away from the drum but affords a "give" or "yield" which upon setting the shoes to contact with the drum by means of the unidirectional driver returns the shoes to a normal working clearance from the drum upon releasing the drive upon the unidirectional driver.

The preferred form of the present invention comprises a cone, cam or wedge interposed between a pair of slidably supported members accommodated or adapted to be accommodated in a support within the brake drum and engaged or adapted to be engaged with the appropriate ends of the shoes and a unidirectional rotatable actuating device for advancing said cone or wedge for the purpose of effecting an expansion adjustment to the shoes, the arrangement being that said unidirectional rotatable driver device normally prevents adjustment of the shoes away from the drum but affords a "give" or "yield" sufficient to produce the normal working clearance between the shoes and the drum.

Figure 5:
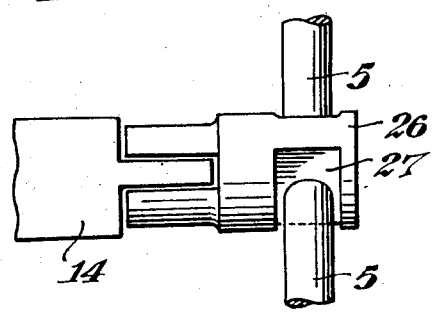
Figure 6:
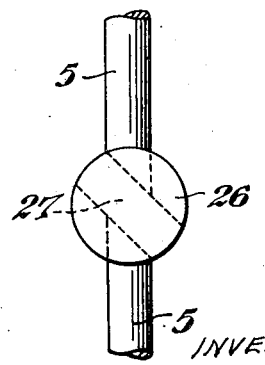

In order that this invention may be clearly understood and readily carried into effect, drawings are appended hereto illustrating an embodiment thereof, and wherein:

Figure 1 is a half sectional plan view of one form of the combined adjuster and driving means therefor, Figure 2 is an elevation view of the driving device looking in the direction of the arrow II in Figure 1, and with the cover plate of such device removed, Figure 3 is a somewhat diagrammatic inside elevation view of a brake drum showing the connection of the adjuster with the brake shoes, Figure 4 is an outside elevation of the back plate of the break drum showing the attachment of the said driving device thereto, Figure 5 is a detail side elevation view of a modified form of head adapted to apply the wedging or expander action to the plungers of the adjuster, Figure 6 is an end elevation of Figure 5, and Figure 7 is a diagrammatic plan view showing how all four wheels of a motor road vehicle can have their brakes adjusted simultaneously from a common driving device.

Referring to Figures 1 to 4 inclusive of the drawings, in Figures 3 and 4 the back plate of the brake is indicated by the reference numeral 1 and the usual pair of arcuate shoes by the reference numeral 2. These shoes can be pivoted at their appropriate opposed ends to the plungers 3 or equivalent elements of an expander 4. The other ends of the shoes are connected operatively by any suitable means to a pair of plungers 5 comprising elements of an adjuster 6. For example, the usual webs or flanges 7 of the shoes can be notched at the ends which are to be engaged with the adjuster plungers 5 and the adjuster plungers engaged with such notches by forked outer ends 8. These adjuster plungers slide in sleeves 9 comprising the limbs of a wide V shaped housing fixed to the back plate.

The adjuster plungers are moved apart, against the influence of a spring 7a connected across the shoes by the axial translative adjustment of a hard steel cone 10 bearing against inclined faces 11 of the inner ends of the adjuster plungers 5 which are formed with inclined inner faces 5a to engage the cone, and the driving means which is manipulated to effect this translative adjustment of the cone 10 is arranged for operation only unidirectionally but affords a very limited backlash or play as hereinafter explained to ensure the shoes being properly spaced from the drum when in the "off" position. The cone 10 may be advanced by a simple push action or, as shown, by a multiple-lead quick pitch worm 12 threaded into a hollow boss 13 of the adjuster housing. This rotation of the worm 12 is effected by applying unidirectional drive, e. g., by a spanner or lever, to a square shank 14 carrying the worm 12. Counter rotation of the shank 14, except for the said limited back-lash or play is prevented by a unidirectional rotary support for the shank in the form of a shallow cylindrical housing 15 accommodating a pawl and ratchet, free wheel, unidirectional friction brake or other suitable device which resists rotation counter to the predetermined direction of rotation for effecting an adjustment of the shoes to take up for wear.

A suitable unidirectional adjusting device may comprise, as shown in Figs. 1 and 2, a rotary disk 16 disposed within the housing 15, coaxially therewith, and provided with peripheral, chordal cam faces or flats 17, and suitable rolling bodies 18, such as rollers or balls, interposed between said cam faces or flats and the inner, cylindrical face of said housing. The cam faces or flats 17 converge in one direction and diverge in the opposite direction relative to the inner, cylindrical face of the housing 15 so that the rolling bodies 18 become wedged between said cam faces or flats and the said inner, cylindrical face of said housing responsive to rotation of said disk in one direction, but are freed responsive to rotation of said disk in the opposite direction. In other words, the housing 15 together with the disk 16 and the rolling bodies 18 constitute a one-way brake permitting free rotation of said disk in one direction and limiting its rotation in the opposite direction. In this connection, it will be noted that abutment portions 19 of the disk 16 separate the cam faces or flats 17 and that said abutment portions have, at their leading edges as regards the direction of free rotation of the disk 16, suitable stop formations 20 to be engaged by the rolling bodies 18 to limit release movement of said rolling bodies from their wedged positions between the flats 17 and the inner face of the housing 15. It will further be noted that the opposite edges 21 of the abutment portions 19 are disposed so as not to interfere with wedging of the rolling bodies 18 between the flats 17 and the inner face of the housing 15. In other words, it is apparent that the disk 16 is at all times free to rotate in one direction and that, in any given position of rotation thereof it locked against rotation in the opposite direction. The abutments 20 may be positioned to permit very little rotation of the disk 16 in a direction to permit release of the brake shoes and the shank 14 may have limited rotation relative to the disk 16 to permit the desired amount of release movement of the brake shoes. Thus, whenever the clearance space between the brake shoes and the brake drum becomes excessive because of wear or due to any other cause, mere rotation of the shank 14 to spread the brake shoes into engagement with the brake drum and then release of said shank obviously is all that is required to insure a predetermined clearance between the shoes and the brake drum when the brake shoes are in their "off" or unapplied positions.

To provide for limited lost motion rotation between the shank 14 and the disk 16 said disk 16 may have a polygonal, axial opening through which the shank 14 extends and said shank may have a polygonal portion disposed in said opening for limited rotation relative to the disk 16.

The housing 15 is, of course, fixed and may be carried, for example, by the back plate 1. It may be provided with apertured ears 22 to accommodate suitable fastening bolts, rivets or the like.

The quick pitch of the worm 12 enables rotation of the shank 14 by the spring 7a to permit the brake shoes to assume their "off" position when shoe adjusting turning effort is removed from said shank.

On certain forms of motor road vehicles the unidirectional adjusters of the brakes may if desired be connected to a common remote control device as shown in Figure 7 in which a housing 15a carries a lengthened shank 14a, the outer ends of which carry radial arms 24 (or cams operating four push-pull rods) connected by cables or rods 25 to arms on the shanks 14 of the adjuster devices 5, which devices 5 need not embody the housings 15 and unidirectional drive means, as the latter is embodied in the housing 15a.

If desired, the aforesaid cone 19 can be replaced by a cam action or rotary wedging device as shown, for example, in Figures 5 and 6. This alternative member comprises a cylindrical head 26 having a forked inner end to receive an interengaging end of a rotary shank 14 which has no movement of translation, the head having a diametrical neck 27 affording a parallel pair of flats against which abut the tapered or part-spherical inner ends of the plungers 5.

I claim:

1. In an expander brake, a brake drum, a pair of brake shoes within said drum, brake applying means for cooperation with adjacent ends of said shoes to expand the latter into braking engagement with said drum, resilient means to contract said shoes and release the same from braking engagement with said drum when said brake applying means is released, and adjusting means for cooperation with the other ends of said shoes to determine the clearance between said shoes and said drum when said brake applying means is released, said adjusting means comprising a rotatable and longitudinally movable shaft, shoe spreading means operable by longitudinal movement of said shaft in one direction to spread said shoes into engagement with said drum, screw means for moving said shaft longitudinally in said direction in response to rotation of said shaft in one direction, said shoe spreading means having a form and said screw means having a quick pitch such that said spring means is effective to contract said shoes and is operable through said shoe spreading means and said screw means to move said shaft longitudinally in the opposite direction and also to rotate said shaft in the opposite direction upon release of shoe-spreading rotative effort exerted upon said shaft in the direction first mentioned, and a rotatable brake device controlling rotation of said shaft and rotatable only in a direction to permit rotation of said shaft in a direction to spread said shoes into engagement with said drum, said shaft having a limited amount of rotative lost motion with respect to said brake device to predetermine the amount of contraction of said shoes and hence the amount of their clearance from said drum upon release of rotative effort upon said shaft in a direction and in an amount to spread said shoes into engagement with said drum.

2. In an expander brake, a brake drum, a pair of brake shoes within said drum, brake applying means for cooperation with adjacent ends of said shoes to expand the latter into braking engagement with said drum, resilient means to contract said shoes and release the same from braking engagement with said drum when said brake applying means is released, and adjusting means for cooperation with the other ends of said shoes to determine the clearance between said shoes and said drum when said brake applying means is released, said adjusting means comprising a rotatable and longitudinally movable shaft, a wedge element operable by longitudinal movement of said shaft in one direction to spread said shoes into engagement with said drum, screw means for moving said shaft longitudinally in said direction in response to rotation of said shaft in one direction, said wedge element having an amount of taper and said screw means having a quick pitch such that said spring means is effective to contact said shoes and is operable through said wedge element and said screw means to move said shaft longitudinally in the opposite direction and to rotate said shaft in the opposite direction upon release of shoe spreading rotative effort exerted upon said shaft in the direction first mentioned, and a rotatable brake device controlling rotation of said shaft and rotatable only in a direction to permit rotation of said shaft in a direction to spread said shoes into engagement with said drum, said shaft having a limited amount of rotative lost motion with respect to said brake device to predetermine the amount of contraction of said shoes and hence the amount of their clearance from said drum upon release of rotative effort upon said shaft in a direction and in an amount to spread said shoes into engagement with said drum.

SPURGEON JENKINS.

REFERENCES CITED

The following references are of record in the file of this patent:

UNITED STATES PATENTS

| Number | Name | Date |
|---|---|---|
| 1,645,554 | Taylor | Oct. 18, 1927 |
| 1,778,341 | Schlegel et al. | Oct. 14, 1930 |
| 1,830,306 | Wemp | Nov. 3, 1931 |
| 1,842,311 | Carner | Jan. 19, 1932 |
| 1,880,368 | Sundquist | Oct. 4, 1932 |
| 1,898,294 | Dodge | Feb. 21, 1933 |
| 1,964,333 | Saunage | June 26, 1934 |
| 1,978,697 | Delahaye | Oct. 30, 1934 |
| 1,992,117 | Bourdan | Feb. 19, 1935 |
| 2,109,284 | Brinck et al. | Feb. 22, 1938 |
| 2,140,219 | Clench | Dec. 13, 1938 |
| 2,157,091 | Baisch | May 9, 1939 |
| 2,259,074 | Main | Oct. 14, 1941 |
| 2,379,796 | Freeman et al. | July 3, 1945 |